July 13, 1948.    E. W. E. KAMM ET AL    2,445,291
REMOTE INVENTORY CONTROL SYSTEM
Filed April 15, 1940    3 Sheets-Sheet 1

Edmund W. E. Kamm
John J. Delaney.
INVENTORS

BY Edmund W. E. Kamm

ATTORNEY.

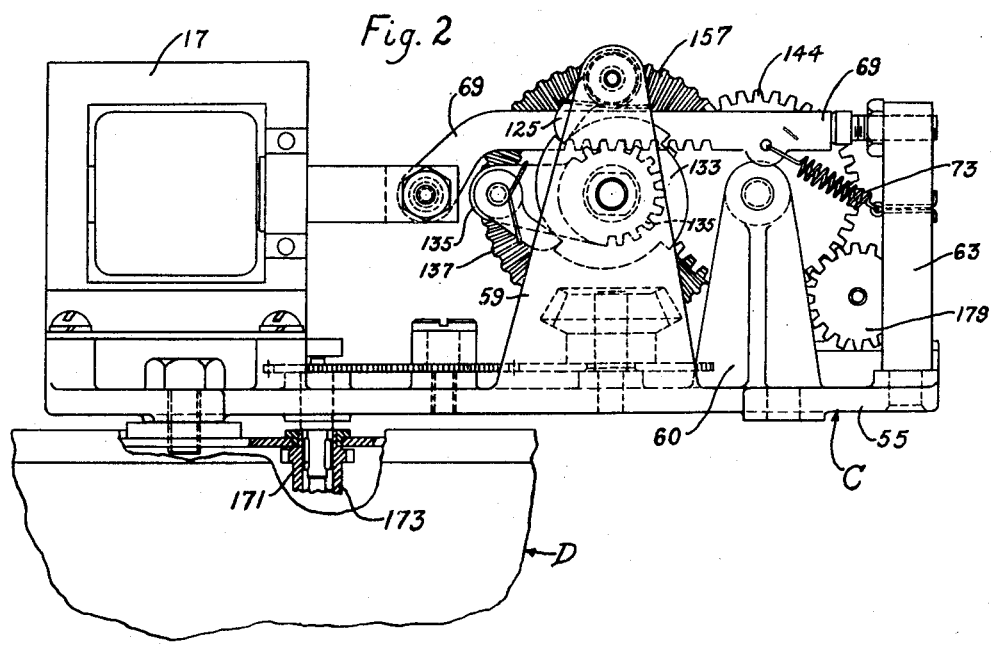
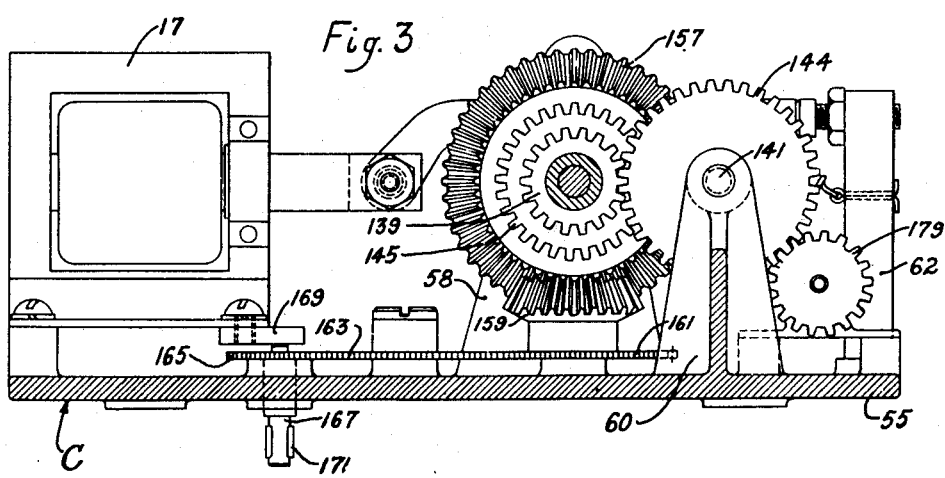

July 13, 1948.　　E. W. E. KAMM ET AL　　2,445,291
REMOTE INVENTORY CONTROL SYSTEM
Filed April 15, 1940　　3 Sheets-Sheet 3
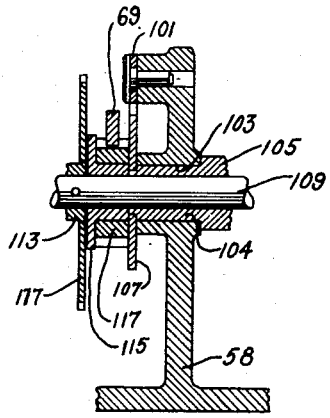
Fig. 4
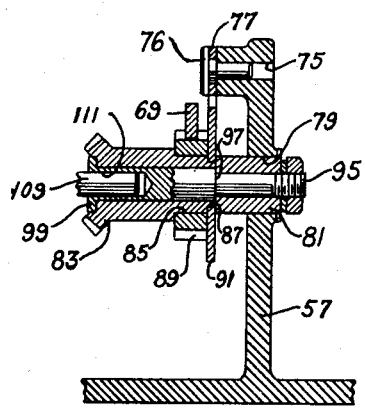
Fig. 5
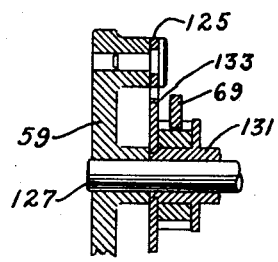
Fig. 8
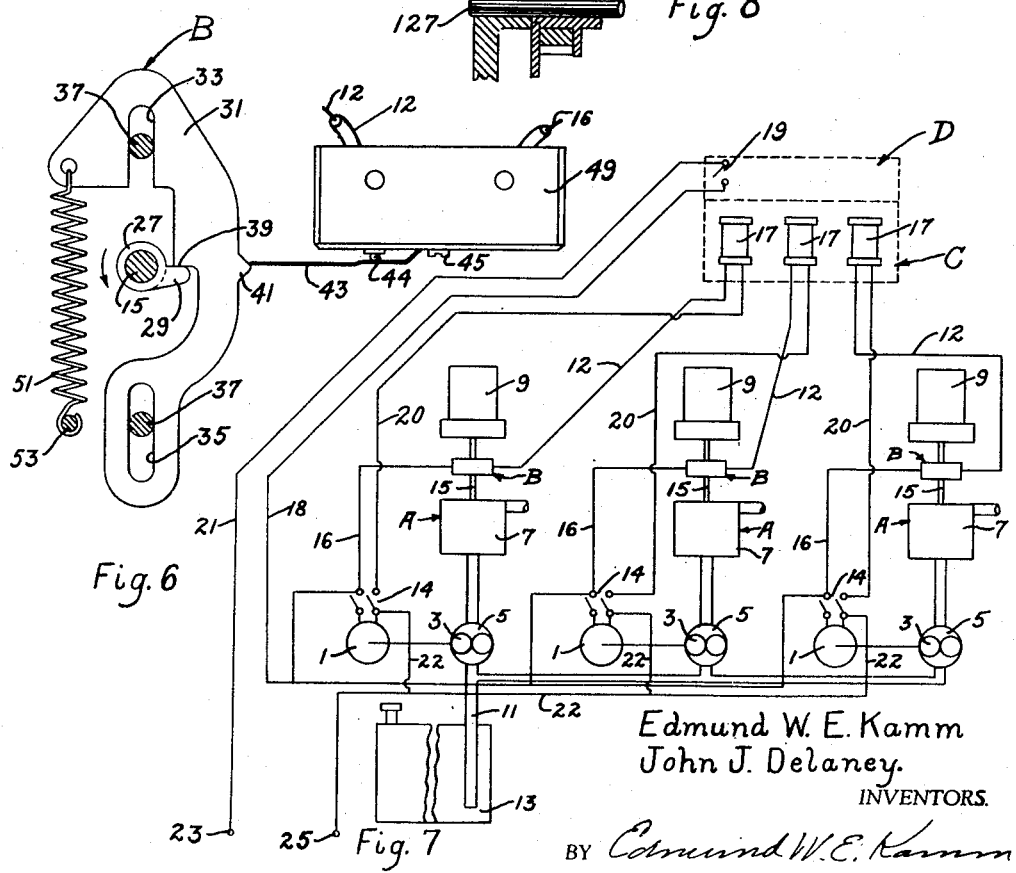
Fig. 6
Fig. 7
Edmund W. E. Kamm
John J. Delaney.
INVENTORS.
BY Edmund W. E. Kamm
ATTORNEY.

Patented July 13, 1948

2,445,291

UNITED STATES PATENT OFFICE 2,445,291

REMOTE INVENTORY CONTROL SYSTEM

Edmund W. E. Kamm and John J. Delaney, Fort Wayne, Ind., assignors to S. F. Bowser & Company, Incorporated, Fort Wayne, Ind., a corporation of Indiana Application April 15, 1940, Serial No. 329,628

16 Claims. (Cl. 222—14)

This invention relates to a system and mechanism which is adapted to be intermittently energized by a plurality of remotely located liquid dispensing units acting individually or simultaneously, and which is adapted to actuate a check controlled apparatus. The latter acts, through the system, to prevent operation of the dispensing units when a predetermined quantity of liquid has been dispensed therefrom.

The check controlled apparatus referred to is that fully disclosed in the application of Robert H. Damon et al., Serial Number 303,036, filed November 6, 1939, now Patent No. 2,247,480. That application also discloses the means for locking the fill pipe which applicants use.

Where a plurality of dispensing pumps are connected to the same tank, as is often the case in large filling stations, the inventory control system mentioned above requires a check controlled apparatus to be installed on each dispensing unit; and there must be deposited in each check controlled apparatus at least one check or token in order that the dispenser with which it is connected may operate. Consequently, if six dispensers are connected to a tank, six tokens representing three hundred gallons of gasoline are tied up in the check controlled devices.

With applicants' mechanism only one of the relatively complicated check controlled devices is required to control any reasonable number of dispensers and only one token need be tied up in the device at one time. If more than one token is inserted, the entire gallonage represented thereby is available at any one of the dispensers so that the entire dispensing system is thus rendered more flexible.

The tank refilling operation is also simplified since the amount of fuel capacity available can be determined by removing the tokens from one check controlled device instead of a plurality of them.

It is also possible to operate a system of a plurality of dispensing units each connected to a separate tank or to a plurality of tanks in different groupings but all connected to a single check controlled apparatus. The inventory checkup would be more involved in such a case.

The invention permits the check controlled apparatus to be disposed in a safe place such as inside the filling station building so that vandalism may be prevented. This is possible because the invention contemplates a remotely controlled apparatus.

This application discloses an apparatus which is capable of connecting three dispensing units to one check controlled apparatus, but it is obvious that the number of units which can be connected is not limited to three, but may be two or more. This will appear more fully in the body of the specification.

An object of the invention is to provide a simple, rugged and inexpensive motion adding mechanism.

Another object of the invention is to provide a remotely controlled inventory control system.

Yet another object of the invention is to provide an electrically operated control system which will be accurate and which will at the same time be flexible.

Still another object of the invention is to provide a remote check controlled dispensing system, control of which is centered in a single check controlled unit.

Another object of the invention is to provide a remote check controlled dispensing system in which the check controlled apparatus may be disposed in a place accessible only to authorized persons.

These and other objects will become apparent from a study of the specification and the drawings which are attached hereto and made a part hereof, and in which:

Figure 2 is an end elevation of the device viewed from the bottom of Figure 1.

Figure 3 is a sectional view taken on the line 3—3 of Figure 1 showing the gearing.

Figure 4 is a sectional view taken on the line 4—4 of Figure 1 showing the central ratchet assembly.

Figure 5 is a sectional view taken on the line 5—5 of Figure 1 showing an end ratchet and gear assembly.

Figure 6 is a plan view of a switch and its operating mechanism.

Figure 7 is a diagrammatic view of the system showing the connections between the dispensing units, switches and solenoids.

Figure 8 is a sectional view taken on the line 8—8 of Figure 1.

General organization

Figure 1:
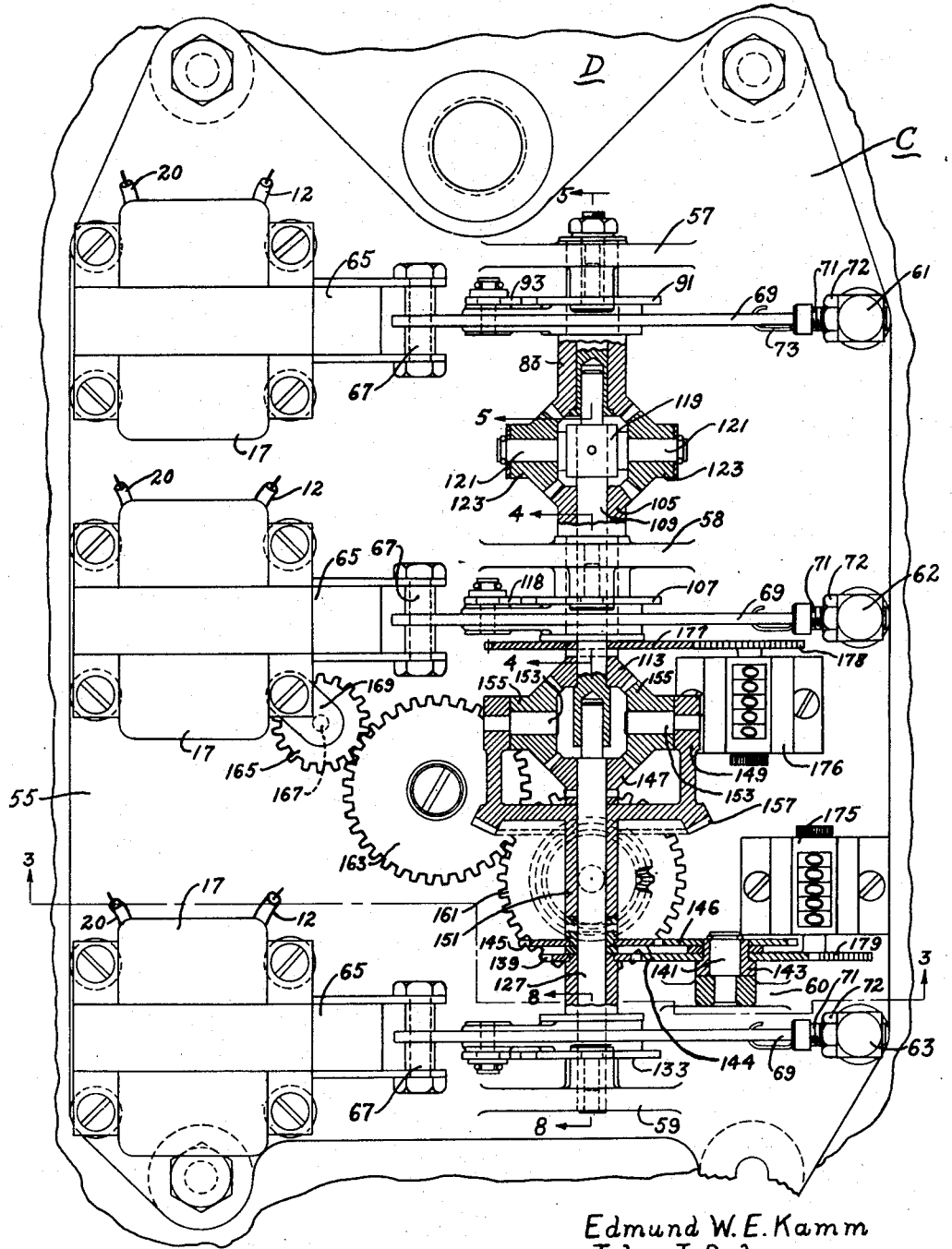
Figure 1 is a plan view of the impulse combining apparatus with the housing removed showing the solenoids and their associated mechanisms.

Referring first to the diagrammatic view of the system, Figure 7, in which is indicated a plurality of filling station pumps indicated generally by the character A, such pumps usually comprise a motor 1, a pump 3 having a relief valve, an air separator 5, a meter 7 and a register 9. All of the pumps are shown connected to a common suction line 11 which communicates with a tank 13 having a locked fill pipe. The usual motor switches 14 and controls therefor are also provided.

Connected to be driven by the meter, and as shown, disposed between the meter and register and driven by shaft 15, is the impulse sending mechanism shown in Figure 6. This mechanism is indicated generally by the character B and will be fully described below. The contacts of the switch are connected on one side by wires 12 to the corresponding solenoids 17 of the impulse combining apparatus indicated generally by the character C, and on the other side through the "hot" sides of the switches 14 by wires 16 and thence by 18, through the switch 19 of the check controlled apparatus indicated generally by character D and through wire 21 to the main at 23.

The solenoids 17 are connected by wires 20 preferably through the "cold" sides of the motor switches 14 and by wires 22 to the main at 25.

Impulse sending means

Referring now to Figure 6 which illustrates the impulse sending mechanism B, the shaft 15 may be the meter shaft or any shaft which is rotated in accordance with the volume of the liquid dispensed.

The shaft is rotated in the direction of the arrow, that is, counter-clockwise, and it carries a hub 27 which is provided with a projecting finger 29.

A slide 31 provided with two slots 33, 35 is mounted to engage a pair of spaced, fixed pins 37 which enter the slots. A shoulder 39 is formed on the slide in a position to be engaged by the finger 29. A lug 41 is formed on an exterior edge of the slide and is adapted to pick up and release a spring metal switch actuator 43 which is fixed at 45 to the body of the switch 49 and which engages a switch button 44.

The switch is held normally open by the pressure of element 43.

A spring 51 is anchored at one end on a fixed pin 53 and is attached at its other end to the slide 31 and serves to urge the slide toward the position in which the upper ends of the slots engage the pins 37.

It will be seen that as the shaft 15 rotates, finger 29 will engage shoulder 39 and the slide will be moved upwardly against the action of the spring 51. As projection 41 passes the lever 43, the latter will bend and permit the lug to pass. As soon as projection 29 disengages the shoulder, spring 51 will return the slide to its lowermost position; and as the lug 41 passes lever 43 it will lift it from contact with the switch button so that the switch will be momentarily closed and then immediately re-opened by 43. Thus there is no possibility that the dispensing device can be stopped with the switch 49 held closed.

Impulse combining mechanism

Figures 1, 2 and 3 disclose the impulse combining mechanism which comprises a mounting plate 55 upon which are mounted the solenoids 17.

A plurality of standards 57, 58, 59 and 60 are preferably cast integrally with the mounting plate and are variously perforated to receive shafts. A plurality of posts 61, 62, 63 are also mounted on the plate in alignment with the solenoids.

Each solenoid is provided with a reciprocable armature 65 which carries a crosshead 67 at its outer end. A rack 69 is pivotally mounted on each crosshead and each rack is provided with a pilot bearing 71 which enters an opening in the associated post. The pilot bearing is threaded and a nut 72 mounted thereon serves to limit the outward movement of the armature. A spring 73 is provided between each post and its associated rack to hold the nut in contact with the post except when the solenoid is energized. Contact of the armature with a fixed plug piece in the solenoid (not shown) limits the inward stroke of the armature and its associated parts.

Referring now to Figure 5, the standard is provided with an opening 75 into which is driven a headed and shouldered pin 76. A holding pawl 77 is pivotally mounted on the pin. Another opening 79 is formed in the standard and a hollow flanged bushing 81 is pressed therein.

A 24-tooth miter gear 83 comprises a hub which is provided with portions of reduced diameter indicated at 85 and 87. On the portion 85 is loosely mounted for rotation a combined gear and pawl carrier 89. On the portion 87 is fixed a four-tooth ratchet 91 which is adapted to be engaged by the pawl 93 which is mounted on carrier 89 and also by the holding pawl 77 described above. Both pawls are spring urged into engagement with said ratchet.

A stub shaft 95 which is provided with a shoulder 97 and a head 99 is inserted in the bushing 81 and held therein by a nut. The gear 83 rotates freely on the shaft between the head thereof and the end of bushing 81.

It will thus be seen that as gear 89 is actuated by rack 69, the ratchet 91 will be advanced one tooth for each actuation and the gear 83 will accordingly be rotated a distance of eight teeth per actuation.

The standard 58, Figure 4, is provided with a holding pawl 101 mounted in a manner similar to pawl 77. The standard is also provided with a bearing 103, and the reduced portion 104 of the hub of a 24-tooth miter gear 105 is rotatably supported in said bearing.

A four-tooth ratchet 107 is fixedly mounted on the end of the hub to hold the hub in place in the bearing.

A shaft 109 passes through the hub 103 and is piloted at one end in a counterbore 111 in shaft 95. The other end of shaft 109 passes through the hub of a 24-tooth miter gear 113 which is pinned to the shaft.

Mounted between gear 113 and ratchet 107 is a flanged collar 115 upon which is mounted for free rotation the gear sector and pawl carrier 117. The sector is driven by a rack 69 and the pawl 118 carried by the sector advances the ratchet 107 and gear 105 one-quarter revolution upon each actuation.

Shown clearly in Figure 1 is a differential spider 119 which is pinned to shaft 109. The carrier is provided with radial stub shafts 121 upon which are mounted 24-tooth miter gears 123 which mesh with the gears 83 and 105 described above.

It will thus be seen that the rotation of the two miter gears in a counter-clockwise direction when viewed from the left, Figures 4 and 5, would induce a counter-clockwise rotation of the shaft 109 by means of the differential connection. This movement would have an amplitude equivalent to the sum of the individual movements of the two gears. Accordingly, the gear 113 is advanced in a counter-clockwise direction so that the compounded movement is made a part of the movement of the second differential. However, due to the speed reducing effect of the differential mechanism, an advance of eight teeth on either the gear 83 or the gear 105 will cause only a four-tooth advance or a one-eighth rotation of the gear 113.

Referring to Figures 2 and 8, the standard 59 is provided with a holding pawl 125 similar to the pawls 77 and 101. A shaft 127 extends through a bearing 129 in the standard and through a flanged collar 131 which rotates loosely upon the shaft.

A four-tooth ratchet 133 is fixed to the collar at the end of the collar and a sector and pawl carrier 135 rotates freely on the collar between the flange and the ratchet. A pawl 137 on the pawl carrier engages the ratchet and is adapted to rotate it in a counter-clockwise direction as viewed in Figure 2.

An eighteen-tooth spur gear 139 is fixed to the other end of the collar so that the ratchet, collar and gear turn as a unit on the shaft.

Mounted on the standard 60 is a stub shaft 141 which carries a hub 143 upon which are mounted in spaced relation a 36-tooth and a 27-tooth gear 144 and 146 respectively. The former meshes with gear 139 fixed to the collar while the latter meshes with a 27-tooth gear 145 which is pinned to shaft 127. The inner end of the shaft 127 is piloted in the end of shaft 109 and has pinned to it a 24-tooth miter gear 147.

The gearing just described serves to reduce the one-quarter revolution per gallon of the ratchet 133 to one-eighth of a revolution at the miter gear 147.

A differential carrier 149 is mounted by means of a hub 151 on shaft 127. The carrier is provided with stub shafts 153 upon which are mounted two 24-tooth differential miter pinions 155 which are adapted to mesh with miter gears 113 and 147.

A 48-tooth miter gear 157 is also mounted on the carrier 149 and drives a 24-tooth miter gear 159 which is in turn fixed to a 36-tooth spur gear 161. The latter is in mesh with a 36-tooth idler gear 163 which in turn drives an 18-tooth gear 165. The latter gear is fixed to a shaft 167 which is held against axial movement by a stop 169 and which is provided with a key 171 or other driving means which engages a mating part 173 in the check controlled apparatus D. The gears 161, 163 and 165 are all suitably positioned by means of bosses formed on the mounting plate 55.

It will be seen that the gearing between the carrier 149 and shaft 167 has the effect of making the shaft rotate four revolutions for each revolution of the pawl carrier. This is designed on the basis of a meter shaft 15 which makes four revolutions a gallon and a check controlled device which requires one revolution per gallon of the element 173. Where the ratios vary, the gearing will have to be changed accordingly.

Where the system is to be used in connection with dispensing units connected to different tanks, it will be necessary to use registers, preferably of the resettable type, one of which is connected to be actuated by the gearing which rotates in proportion to the sum of the impulses received from all of the pumps connected with the same tanks.

As shown in Figure 1, we shall assume that two pumps which are connected with a single tank have their sender units B connected to energize the upper two solenoids while the third pump is connected to energize the lower solenoid.

To indicate the total gallonage removed from the tank by the two pumps, the register 176 is provided. It has a gear 178 which meshes with a gear 177. The latter is, in turn, fixed to, or formed integrally with the sun gear 113.

Similarly, the gear 179 which meshes with gear 144, drives the register 175 which records the number of gallons dispensed from the other of the two tanks.

Thus, the tank wagon driver who removes the tokens or checks from the apparatus D knows, for instance, that when eleven tokens are collected, 550 gallons of liquid have been removed from the two tanks. By reading the registers 175 and 176 he can see that 100 gallons have been removed from the single pump tank which may be designated in any suitable way, as by colored fill pipe which corresponds with the color of the register or by suitable marks or characters, and that the remainder has been drawn from the double pump tank. Thus, he will know how much each tank will receive and there will be no danger of overflowing either tank.

When the collection is completed and the driver has the necessary information he resets the register to zero for subsequent operation.

*General operation*

In order to dispense liquid from any one of the units A, it is first necessary that a credit balance exist in favor of the operator on the check operated apparatus D; otherwise, the switch 19 will be open and the circuit will be broken through all of the dispensing units. If this switch is open it will be necessary for the operator to first insert a token in D to obtain a credit balance in his favor.

He may then close any one of the switches 14 and dispense liquid through the apparatus. At the same time, another operator may use another of the devices A without interfering with the system.

As liquid passes through the meter 7, the shaft 15 is rotated, in this case, four revolutions for every gallon dispensed and, consequently, there will be four impulses sent over the circuit 23, 21, 19, 18, 14, 16, 49, 12, 17, 20, 14, 22 and 25 for every gallon of liquid dispensed. This means that the associated solenoid and operating mechanism, for instance, the ratchet 91, will be actuated four times per gallon, and this complete rotation of the ratchet will result in a half revolution of differential carrier 121 and in a quarter revolution of carrier 149; but since the gearing between the latter and the shaft 167 is four to one, the shaft will be advanced a full revolution.

Actuation of the ratchet 107 by the second apparatus A will produce a like result.

Four successive actuations of the ratchets 91 and 107 simultaneously would produce a full revolution of spider 121, a half revolution of spider 149 and two full revolutions of shaft 167.

Actuation of ratchet 133 a full revolution produces a quarter revolution of spider 149 and hence a full revolution of shaft 167.

Actuation of either ratchet 91 or 107 simultaneously with ratchet 133 through four successive actuations produces a half revolution of spider 149, hence two full revolutions of shaft 167.

The last possibility is that of simultaneous operation of all three ratchets and for four successive actuations each. The ratchets 91 and 107 combine to give the spider 149 a half turn, as explained above; while the ratchet 133 operating alone gives the spider a quarter turn. These movements are additive so that the spider will be given a three-quarter turn and shaft 107 will be driven three full revolutions.

As soon as the credit set up on the check controlled apparatus D is exhausted, the switch 19 will be opened and all of the dispensing devices will be stopped irrespective of the closed condition of switches 14.

It is obvious that if a number of dispensing units A are connected to a particular tank and others in the same system are connected to other tanks, the registers 175, 176 may be connected by gearing to the particular point in the additive gear system where the movements of the respective solenoids have been compounded.

For instance, if in the system shown one pump A is connected to a tank and the other pumps are connected to a different tank, the system would be arranged so that ratchet 133 is operated by the first pump and ratchets 91 and 107 are operated by the other pumps. The register for the first tank would accordingly be driven by the gearing between ratchet 133 and gear 147, while a single register connected to the gearing between spider 121 and gear 113 would serve to indicate the liquid removed from the second tank.

The object of this, of course, is to save computation by, and prevent possible error on the part of the truck driver. The registers 175 indicate at once to the truck operator the amount of liquid which can be placed in the tanks buried in the particular station being served.

It is apparent that various changes may be made in the size, form, construction and arrangement of parts without departing from the spirit of the invention; and accordingly, applicants do not desire to be limited to the specific forms herein described by way of illustration, but instead, desire protection falling reasonably within the scope of the appended claims.

What we claim to be new and desire to protect by Letters Patent of the United States is:

1. In a liquid dispensing system the combination of liquid storage means, a plurality of liquid dispensers connected to said storage means, each dispenser comprising a meter, a device connected to control the operation of all of said dispensers, a check presettable stop apparatus associated with said control device and adapted to condition it to permit operation of said dispensers when a credit is set up on said apparatus and to operate said device to prevent operation of said dispensers when said credit is exhausted, and means for connecting the meters of all of said dispensers to actuate said apparatus to reduce the credit set up on said apparatus in proportion to the liquid dispensed through each meter.

2. In a liquid dispensing system, the combination of locked liquid storage means, a plurality of liquid dispensers each comprising a meter and each connected to draw liquid from said storage means and discharge it through said meter, a device connected with, and operable to permit or prevent operation of said dispensers, a check presettable stop apparatus associated with said device and adapted to condition it to permit operation of said dispensers when a credit is set up on said apparatus and to operate said device to prevent operation of said dispensers when said credit is exhausted, and means operable by said meters and connected to actuate said apparatus to reduce the credit set up on said apparatus in proportion to the liquid dispensed through the meter of each dispenser.

3. In a liquid dispensing system the combination of liquid storage means, a plurality of liquid dispensers connected to said storage means and operable at will to dispense liquid therefrom, a device connected to control the operation of all of said dispensers, a presettable stop apparatus associated with said control device and adapted to condition it to permit operation of said dispensers when a credit is set up on said apparatus and to operate said device to prevent operation of said dispensers when said credit is exhausted, and means for connecting all of said dispensers with said apparatus to actuate it to simultaneously reduce the credit set up on said apparatus in proportion to the liquid dispensed through each.

4. In a liquid dispensing system the combination of liquid storage means, a plurality of liquid dispensers connected to said storage means, a device connected to control the operation of all of said dispensers, a check presettable stop apparatus associated with said control device and adapted to condition it to permit operation of said dispensers when a credit is set up on said apparatus and to operate said device to prevent operation of said dispensers when said credit is exhausted, and means for connecting all of said dispensers to reduce the credit set up on said apparatus in proportion to the liquid dispensed through each, said connecting means comprising actuating units, one associated with each dispenser and actuated thereby, differential means connected to be driven by said units and connected to drive said check controlled apparatus in proportion to the sum of the actuations of said units.

5. In a liquid dispensing system, the combination of a plurality of storage tanks, a plurality of liquid dispensers each connected to draw liquid from a tank, a device connected with said dispensers and operable to and from operation permitting and preventing positions, a check presettable stop apparatus associated with said device and adapted to operate it to operation permitting position to permit operation of said dispensers when a credit is set up on said apparatus and to operate said device to operation preventing position to prevent operation of said dispensers when said credit is exhausted, means to reduce the credit set up on said apparatus in proportion to the liquid dispensed through each dispenser, said means comprising actuating units, one associated with each dispenser and actuated thereby, differential means connected to be driven by the units associated with the dispensers connected with the same tank, said differential means being connected to actuate a register and said apparatus in proportion to the sum of the individual actuations of said associated units.

6. In a liquid dispensing system, the combination of a plurality of storage tanks, a plurality of liquid dispensers each connected to draw liquid from a tank, a device connected with, and operable to permit or prevent operation of said dispensers, a check presettable stop apparatus associated with said device and adapted to condition it to permit operation of said dispensers when a credit is set up on said apparatus and to operate said device to prevent operation of said dispensers when said credit is exhausted and means to reduce the credit set up on said apparatus in proportion to the liquid dispensed through each dispenser, said means comprising actuating units, one associated with each dispenser and actuated thereby, differential means connected to be driven by the units associated with the dispensers connected with the same tank, said differential means being connected to actuate a register in proportion to the sum of the individual actuations of said associated units, and additional differential means connected to be driven by said first named differential means and connected to drive said check controlled apparatus in proportion to the sum of the actuations of all of the actuating units.

7. In a liquid dispensing system comprising storage means, a plurality of dispensers connected with said means, an impulse transmitting system associated with each dispenser, each system comprising an impulse actuated motor disposed at a central station, control means adapted to prevent operation of said dispensers, comprising a control element located at said station and movable to operation preventing position, and means actuated by said motors for moving said control element to said position after a predetermined amount of liquid has passed through said dispensers.

8. In a liquid dispensing system comprising storage means, a plurality of dispensers connected with said means, an impulse transmitting system associated with each dispenser, each system comprising an impulse actuated motor disposed at a central station, control means adapted to prevent operation of said dispensers, comprising a control element located at said station and movable to operation preventing position, and means actuated by said motors for moving said control element to operation preventing position after a predetermined amount of liquid has passed through said dispensers, said last named means comprising a presettable stop mechanism interposed between said motors and said control element.

9. In a liquid dispensing system comprising storage means and a plurality of dispensers connected therewith, each dispenser comprising a meter adapted to be driven in proportion to the liquid dispensed, a circuit for controlling the operation of each dispenser, said circuit including a switch, a presettable stop mechanism for controlling said switch, a plurality of motors connected to drive a differential mechanism which is constructed and arranged to advance said stop mechanism a distance proportional to the sum of the driving effects of said motors, a plurality of meter driven controllers, and a control circuit connecting each motor with an associated controller to cause operation of said motors in time with the meters.

10. In a liquid dispensing system, a liquid dispenser comprising a meter, a manually controlled switch, a register, a motor for operating said register, a circuit for said motor supplied from said switch, a second switch in said circuit, and means for operating said last named switch comprising an element mounted for oscillation, a meter driven member adapted to move said element in one direction and to release it for return movement, and means actuated by said element during said return movement for closing said second switch.

11. In a liquid dispensing system, a liquid dispenser comprising a meter, a manually controlled switch, a register, a motor for operating said register, a circuit for said motor supplied from said switch, a second switch in said circuit, and means for operating said last named switch comprising an element mounted for oscillation, a meter driven member adapted to move said element in one direction and to release it for return movement, means for returning said element to its initial position, and means positioned to be actuated by and released from said element during said return movement for closing and reopening said second switch.

12. In a liquid dispensing system, a register, a motor for operating said register, a meter driven in accordance with the flow of liquid from said system, a circuit for controlling said motor comprising a manually operable switch and a control switch, means for closing said control switch, an actuator adapted to hold said control switch normally open, a reciprocating element, means actuated by said meter for moving said element in one direction from a normal position and for releasing it, means for returning said element to normal position, means on said element adapted to engage and pass beyond said actuator in switch opening direction on the meter driven stroke, and to engage said actuator and move it to switch closing position and to thereafter release it on the return stroke to secure a timed closure of said control switch.

13. In a dispensing system, a liquid dispenser control mechanism comprising a presettable stop mechanism, solenoids adapted to be controlled by electrical impulses, a differential unit comprising two sun gears, each connected to be driven by a solenoid a predetermined distance upon each operation, a satellite gear and a carrier therefor, adapted to be driven by said sun gears, and connections between said carrier and said stop mechanism for advancing the latter in proportion to the operations of said solenoids.

14. In a dispensing system, a control mechanism, comprising a presettable stop mechanism, solenoids adapted to be controlled by electrical impulses, a differential unit comprising two solenoid driven sun gears, each connected to be driven a predetermined distance upon each operation, a satellite gear and a carrier therefor, adapted to be driven by said sun gears and connected to drive a sun gear of a second differential, a third solenoid, means connecting said third solenoid to drive the second sun gear of said second differential, a second satellite gear and a carrier therefor, and connections between said last named carrier and said stop mechanism for advancing said stop mechanism in proportion to the operations of said solenoids.

15. In a dispensing system, a control mechanism comprising a presettable stop mechanism, solenoids adapted to be controlled by electrical impulses, a differential unit comprising two sun gears, each connected to be driven by a solenoid a predetermined distance upon each operation, a satellite gear and a carrier therefor, adapted to be driven by said sun gears and connected to drive a sun gear of a second differential, a third solenoid, means connecting said third solenoid to drive the second sun gear of said second differential, a second satellite gear and a carrier therefor, connections between said latter carrier and said stop mechanism for advancing said predeterminer in proportion to the operations of said solenoids, and means for modifying the amplitude of motion imparted by said third solenoid to its sun gear in one operation to equal that imparted in one operation of any one of the other solenoids to the other sun gear of said second differential.

16. In a dispensing system, a control mechanism comprising a presettable stop mechanism, solenoids adapted to be controlled by electrical impulses, a differential unit comprising two sun gears, each connected to be driven by a solenoid a predetermined distance upon each operation, a satellite gear and a carrier therefor, adapted to be driven by said sun gears and connected to drive a sun gear of a second differential, a third solenoid, means connecting said third solenoid to drive the second sun gear of said second differential, a second satellite gear and a carrier therefor, connections between said carrier and said stop mechanism for advancing the latter in proportion to the operations of said solenoids, and a register connected to be driven in time with each of the sun gears of said second differential.

EDMUND W. E. KAMM.
JOHN J. DELANEY.

REFERENCES CITED

The following references are of record in the file of this patent:

UNITED STATES PATENTS

| Number | Name | Date |
|---|---|---|
| 697,493 | Kelly et al. | Apr. 15, 1902 |
| 1,084,632 | Heuser | Jan. 10, 1914 |
| 1,866,523 | Alexander | July 12, 1932 |
| 1,977,781 | Slaegemann | Oct. 23, 1934 |
| 2,049,634 | Troutman | Aug. 4, 1936 |
| 2,051,597 | Head | Aug. 18, 1936 |
| 2,060,674 | Hicks | Nov. 10, 1936 |